(12) United States Patent
Diaz

(10) Patent No.: US 11,064,839 B2
(45) Date of Patent: Jul. 20, 2021

(54) BLENDER WITH BAFFLE FOR REDUCING NOISE

(71) Applicant: Hamilton Beach Brands, Inc., Glen Allen, VA (US)

(72) Inventor: Paul Diaz, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 526 days.

(21) Appl. No.: 15/958,838

(22) Filed: Apr. 20, 2018

(65) Prior Publication Data

US 2019/0320849 A1 Oct. 24, 2019

(51) Int. Cl.
*A47J 43/07* (2006.01)
*A47J 47/02* (2006.01)
*A47J 43/046* (2006.01)

(52) U.S. Cl.
CPC ......... *A47J 43/0716* (2013.01); *A47J 43/046* (2013.01); *A47J 47/02* (2013.01)

(58) Field of Classification Search
CPC ...... A47J 43/0716; A47J 43/046; A47J 47/02; H02K 5/20; H02K 9/06
USPC ....................................................... 181/200
See application file for complete search history.

(56) References Cited

U.S. PATENT DOCUMENTS

| 3,901,484 | A | * | 8/1975 | Ernster | A47J 43/085 241/282.2 |
| 5,273,358 | A | * | 12/1993 | Byrne | H02K 9/06 310/51 |
| 7,942,570 | B2 | * | 5/2011 | Steiner | H02K 5/20 366/197 |
| 2006/0007778 | A1 | * | 1/2006 | Tai | H02K 9/14 366/205 |
| 2007/0046111 | A1 | * | 3/2007 | Lagier | H02K 9/06 310/58 |
| 2018/0263419 | A1 | * | 9/2018 | Nernberger | A47J 43/0716 |

FOREIGN PATENT DOCUMENTS

WO WO-2009049355 A1 * 4/2009 ............... H02K 9/14

* cited by examiner

*Primary Examiner* — Forrest M Phillips
(74) *Attorney, Agent, or Firm* — Alexander D. Raring

(57) ABSTRACT

A blender includes: a base unit, the base unit including a vent in fluid communication with external air; a motor mounted within the base unit and configured to drive blender blades; a cooling fan mounted in the base unit to draw air though the vent and past the motor; and a conduit formed within the base unit that provides an exit path for air drawn past the motor by the fan. The conduit follows a path that serially includes a reservoir beneath the fan, a first choke point, a first chamber, a second choke point, a second chamber, a third choke point, and a third chamber in fluid communication with an exit port at the rear of the base unit.

23 Claims, 7 Drawing Sheets

BLENDER WITH BAFFLE FOR REDUCING NOISE

The present invention relates to a kitchen blender, and more specifically to techniques for reducing motor noise in a blender.

BACKGROUND OF THE INVENTION

Kitchen countertop appliances incorporate electric motors operable to slice, dice, crush, mix, blend or otherwise process food and drink products. The motors, which generally operate at high speeds, are cooled to operate efficiently. Typically, electric appliance motors are cooled by a fan integral to the motor wherein the fan blows air on or draws air over the motor during operation.

Unfortunately, many existing appliance cooling systems are inefficient. This commonly occurs because the appliance moves an insufficient volume of cooling air, often due to vents of inadequate surface area, and/or may have an inefficient air outlet configuration. These inefficiencies may result in reduced cooling.

In addition to cooling the motor, fan operation creates noise. Consequently, if a designer tries to compensate for the poor cooling of a motor with a more aggressive fan, the result creates even more noise. Thus, there is a balance that must be struck between the power level of the fan (which increases cooling by drawing more air over the motor) with noise generation (a more powerful motor typically generates more noise). The exit outlet of the cooling air may be a particularly prominent outlet for motor/fan noise. As such, different designs of motors, fans, and blender housings demand unique and novel air flow designs.

SUMMARY

As a first aspect, embodiments of the disclosure are directed to a blender, comprising: a base unit, the base unit including a vent in fluid communication with external air; a motor mounted within the base unit and configured to drive blender blades; a cooling fan mounted in the base unit to draw air though the vent and past the motor; and a conduit formed within the base unit that provides an exit path for air drawn past the motor by the fan. The conduit follows a path that serially includes a reservoir beneath the fan, a first choke point, a first chamber, a second choke point, a second chamber, a third choke point, and a third chamber in fluid communication with an exit port at the rear of the base unit.

As a second aspect, embodiments of the disclosure are directed to a blender, comprising: a base unit, the base unit including a vent in fluid communication with external air; a motor mounted within the base unit and configured to drive blender blades; a cooling fan mounted in the base unit to draw air though the vent and past the motor; and a conduit formed within the base unit that provides an exit path for air drawn past the motor by the fan. The conduit follows a path that serially includes a reservoir beneath the fan, a first choke point, a first chamber, a second choke point, a second chamber, a third choke point, a third chamber, a fourth choke point, and a fourth chamber in fluid communication with an exit port at the rear of the base unit.

As a third aspect, embodiments of the disclosure are directed to a blender, comprising: a base unit, the base unit including a vent in fluid communication with external air, the vent being located on one side of the base unit; a motor mounted within the base unit and configured to drive blender blades; a cooling fan mounted in the base unit to draw air though the vent and past the motor; and a conduit formed within the base unit that provides an exit path for air drawn past the motor by the fan. The conduit follows a path that serially includes a reservoir beneath the fan, a first choke point, a first chamber, a second choke point, a second chamber, a third choke point, and a third chamber, the second choke point and the second chamber being located laterally of the first chamber on an opposite side of the base unit from the vent, the conduit being in fluid communication with an exit port at the rear of the base unit.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
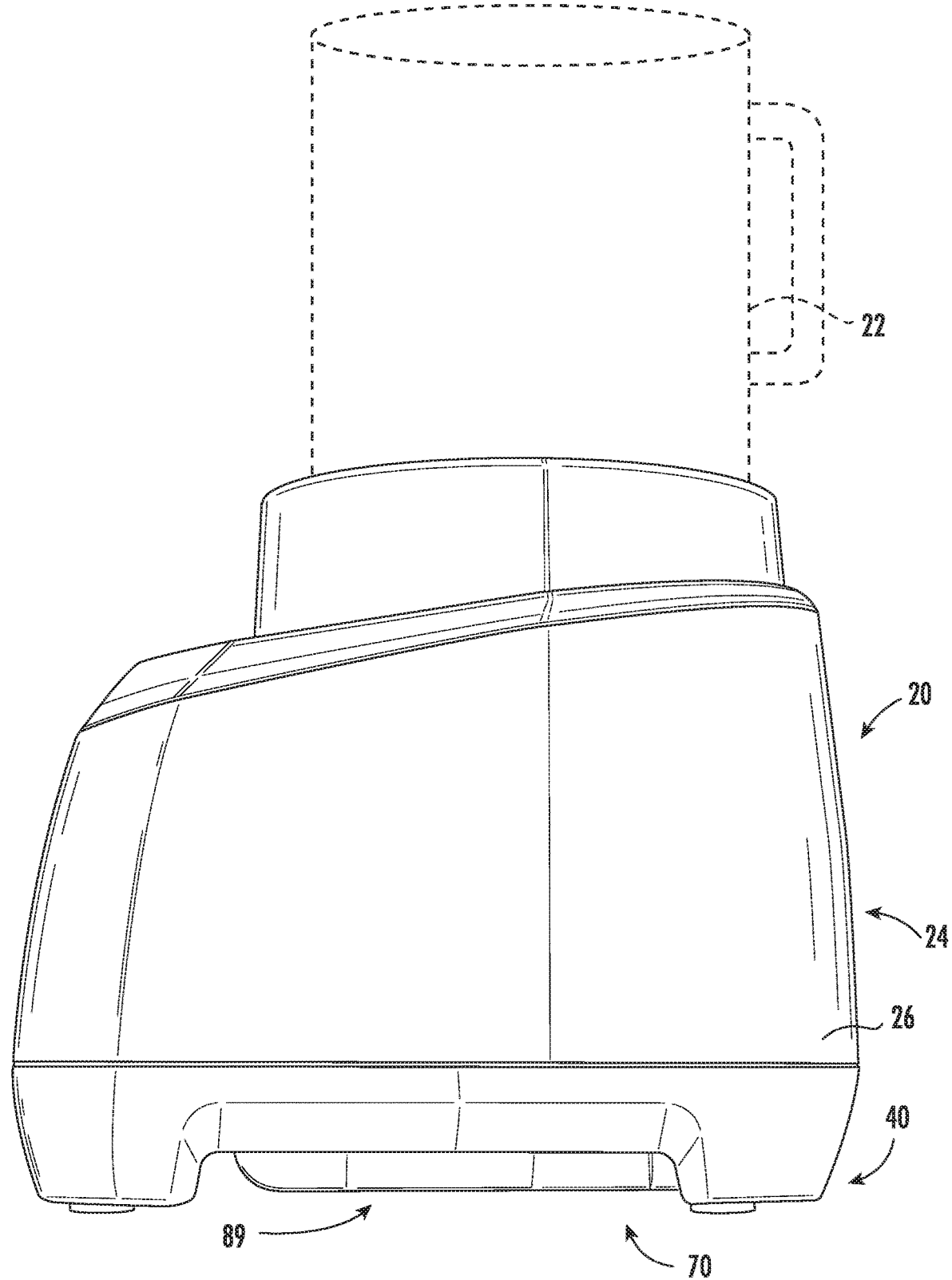
FIG. 1 is a perspective view of a countertop blender according to embodiments of the disclosure.
Figure 2:
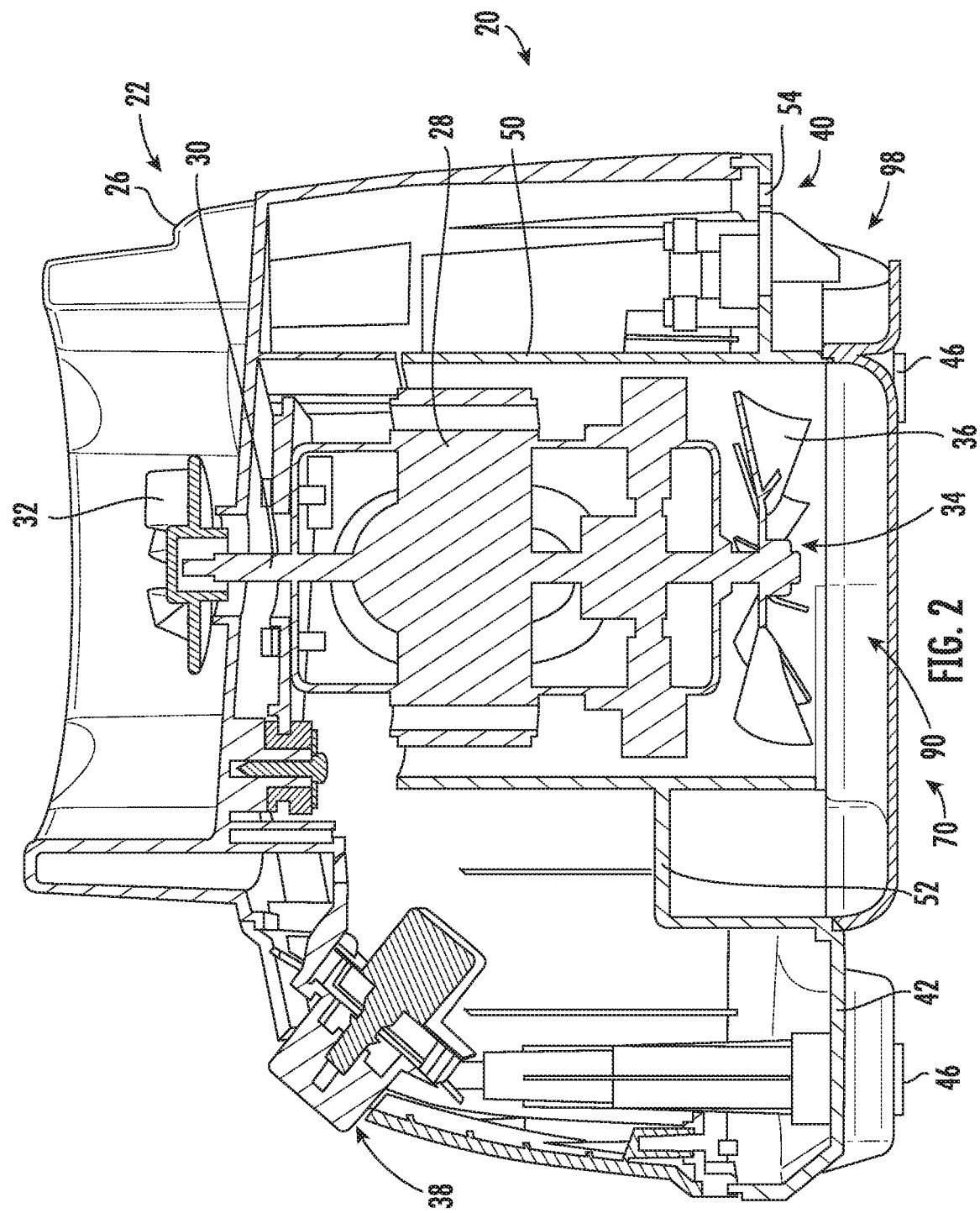
FIG. 2 is a side section view of the blender of FIG. 1.
Figure 3:
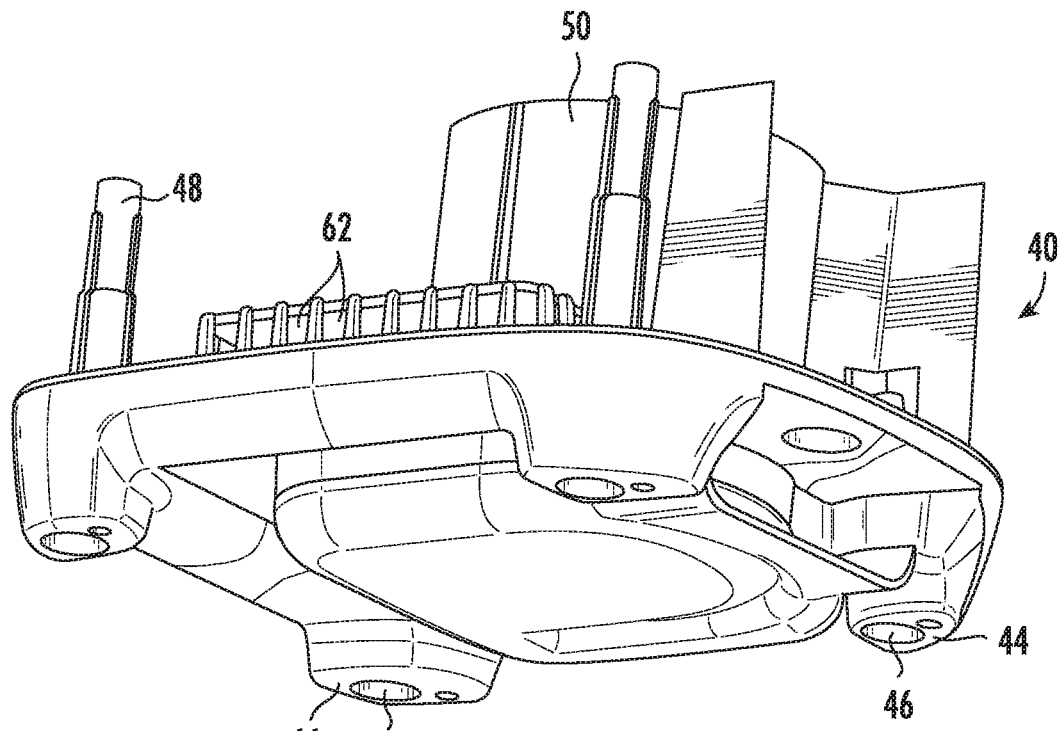
FIG. 3 is a bottom perspective view of the lower housing and the baffle plate of the blender of FIG. 1.
Figure 4:
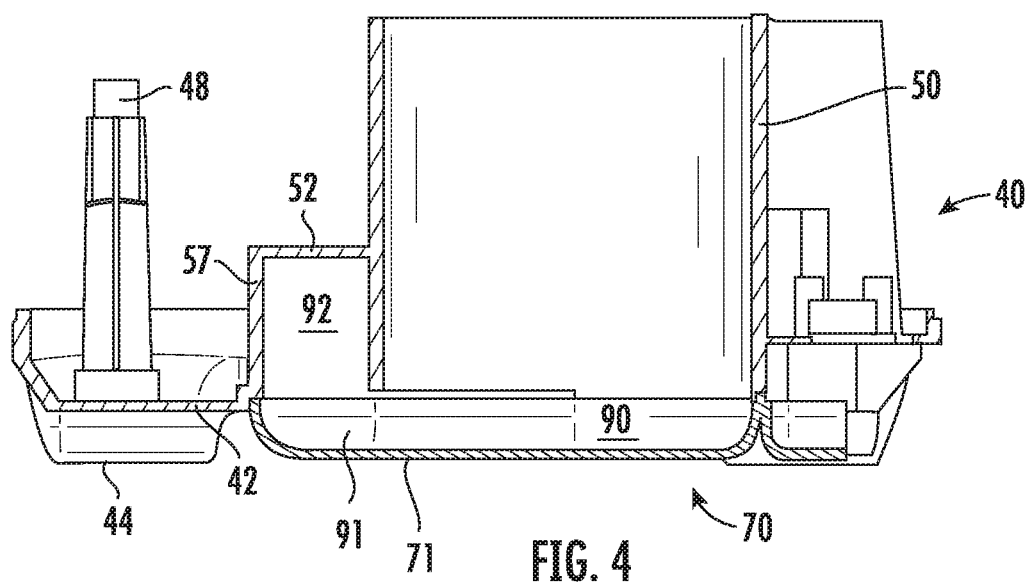
FIG. 4 is a side section view of the lower housing and baffle plate of FIG. 3.

Referring now to the drawings, a countertop blender, designated broadly at 20, is shown in FIG. 1. The blender 20 includes a removable vessel 22 (shown in broken line) that receives ingredients for blending. The vessel 22 sits atop a base unit 24. As can be seen in FIG. 2, the base unit 24 includes an upper housing 26, a motor 28 that is attached via a shaft 30 to impellers 32 that drive blades within the vessel 22 for blending, a fan 34 with blades 36 mounted under the motor 28, and a control box 38 with buttons, dials, or other devices for activating the blender 20 and/or adjusting its operation parameters (e.g., speed). Those of skill in this art will recognize that these components may be of conventional construction and operation and need not be described in detail herein.

The control box 38 is mounted to the front of the housing, thereby defining the "front" or "forward" direction for descriptive purposes of components discussed herein. The "rear" direction is, naturally, opposite the front direction. As used herein, the "lateral" direction means either horizontal direction originating at the midline of the base unit 24 and extending normal thereto, whereas "inward" refers to the opposite of the lateral direction.

The base unit 24 also includes a lower housing 40 (see FIGS. 2-7). The lower housing 40, typically formed of a polymeric material such as acrylonitrile-butadiene-styrene (ABS), is located below the upper housing 26, with much of the lower housing being enclosed by the upper housing 26. The lower housing 40 includes a foundation 42 with four foot pedestals 44 that receive feet 46. Bosses 48 rise from the pedestals 44 to provide attachment points to the upper housing 26 and other components, such as the control box 38.

A generally cylindrical shroud 50 extends upwardly from the center of the foundation 42 of the lower housing 40. As can be seen in FIG. 2, the shroud 50 circumferentially surrounds the motor 28 and the fan 34. A conduit platform 52 surrounds the shroud 50 on all sides, with the rear portion 54 of the conduit platform 52 being somewhat lower in elevation that the remainder of the conduit platform 52. Vertical walls 56, 57, 58 rise from the foundation 42 to meet the duct platform 52 to the front and to both sides of the shroud 50, with walls 56, 58 pinching inwardly to meet the rear portion 54. In addition, inner vertical walls 63, 64, 65 surround the shroud 50 to the front and on both sides. A choke flange 60 extends from the wall 58 toward the shroud 50. Vents 62 are present in the upper portion of the wall 56 and in an adjacent portion of the wall 57.

Figure 8:
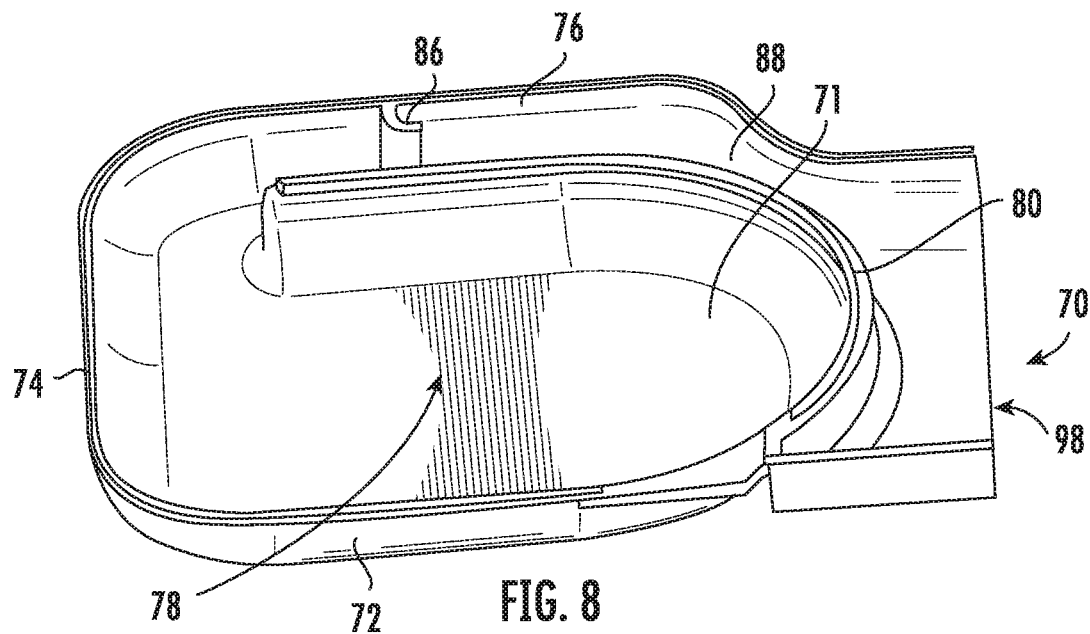
FIG. 8 is a side perspective view of the baffle plate of FIG. 3.
Figure 9:
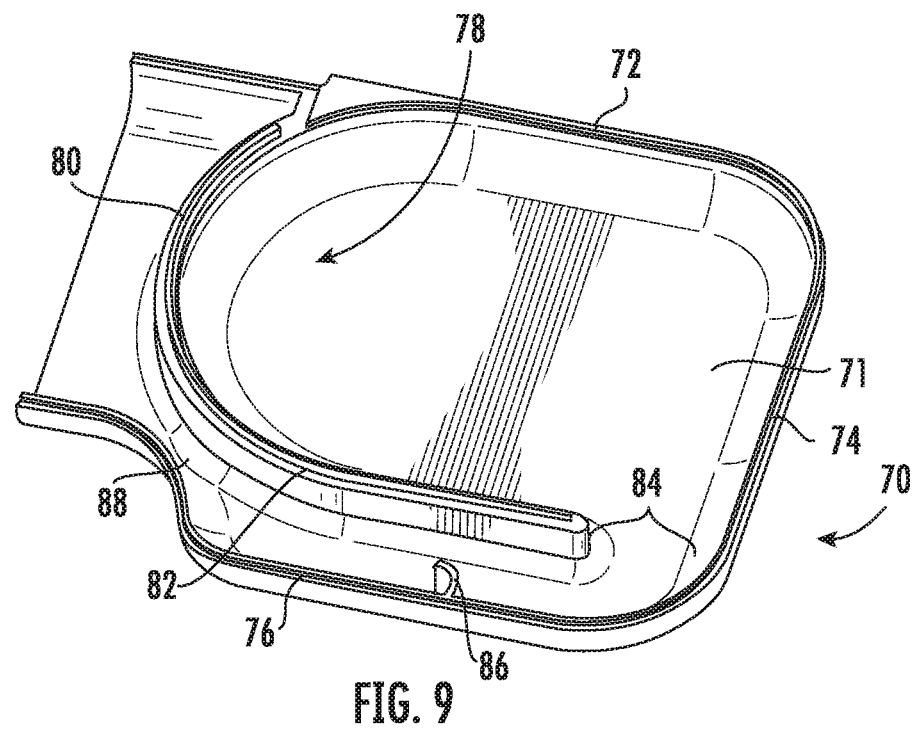
FIG. 9 is an opposite side perspective view of the baffle plate of FIG. 3.

A baffle plate 70 is positioned below the lower housing 40 (see FIGS. 2-4, 8 and 9). The baffle plate 70 has a horizontal floor 71 and side walls 72, 74, 76 that extend upwardly to meet the lower edges of the walls 65, 57, 58 of the lower housing 40. The baffle plate 70 also includes an interior wall 78 that has a semicircular section 80 that meets the lower edge of the rear portion of the shroud 50 and a straight section 82 that extends forwardly from the semicircular section 82 generally parallel with the wall 76 and meets the lower edge of the wall 63. As can be seen in FIGS. 8 and 9, a gap 84 is present between the straight section 82 and the wall 74. A choke flange 86 extends from the wall 76 toward the straight section 82 and meets the lower edge of the choke flange 60. In addition, a neck 88 is formed between the semicircular section 80 and an inwardly bending section 58a of the wall 58. Notably, the baffle plate 70 does not extend laterally to meet the wall 56 of the lower housing 40 (see FIG. 5), with the result that a passageway 89 is present below the lower housing 40 that enables external air to enter the base unit 24 through the vents 62.

Figure 5:
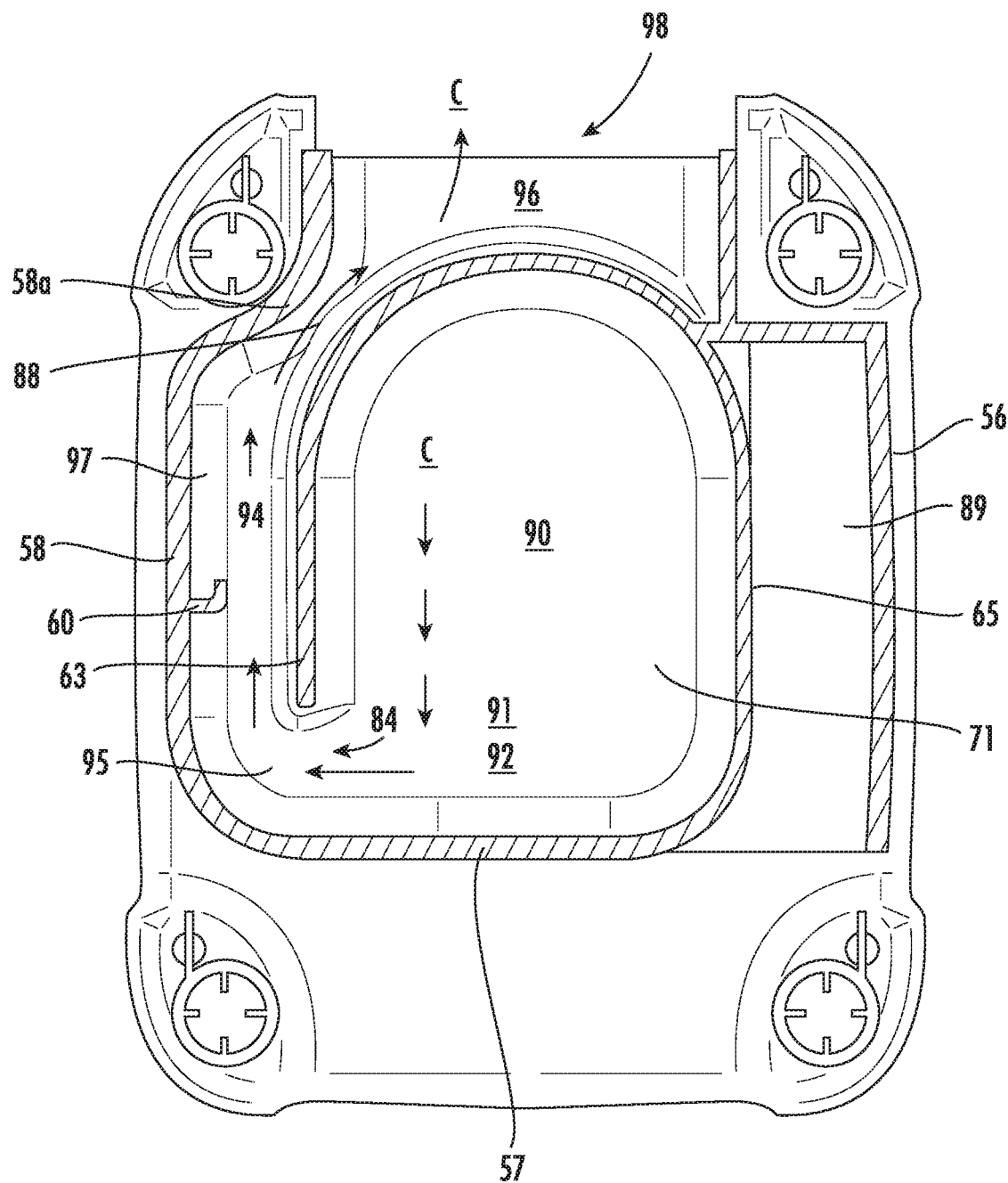
FIG. 5 is a top section view of the lower housing and baffle plate of FIG. 3.
Figure 6:
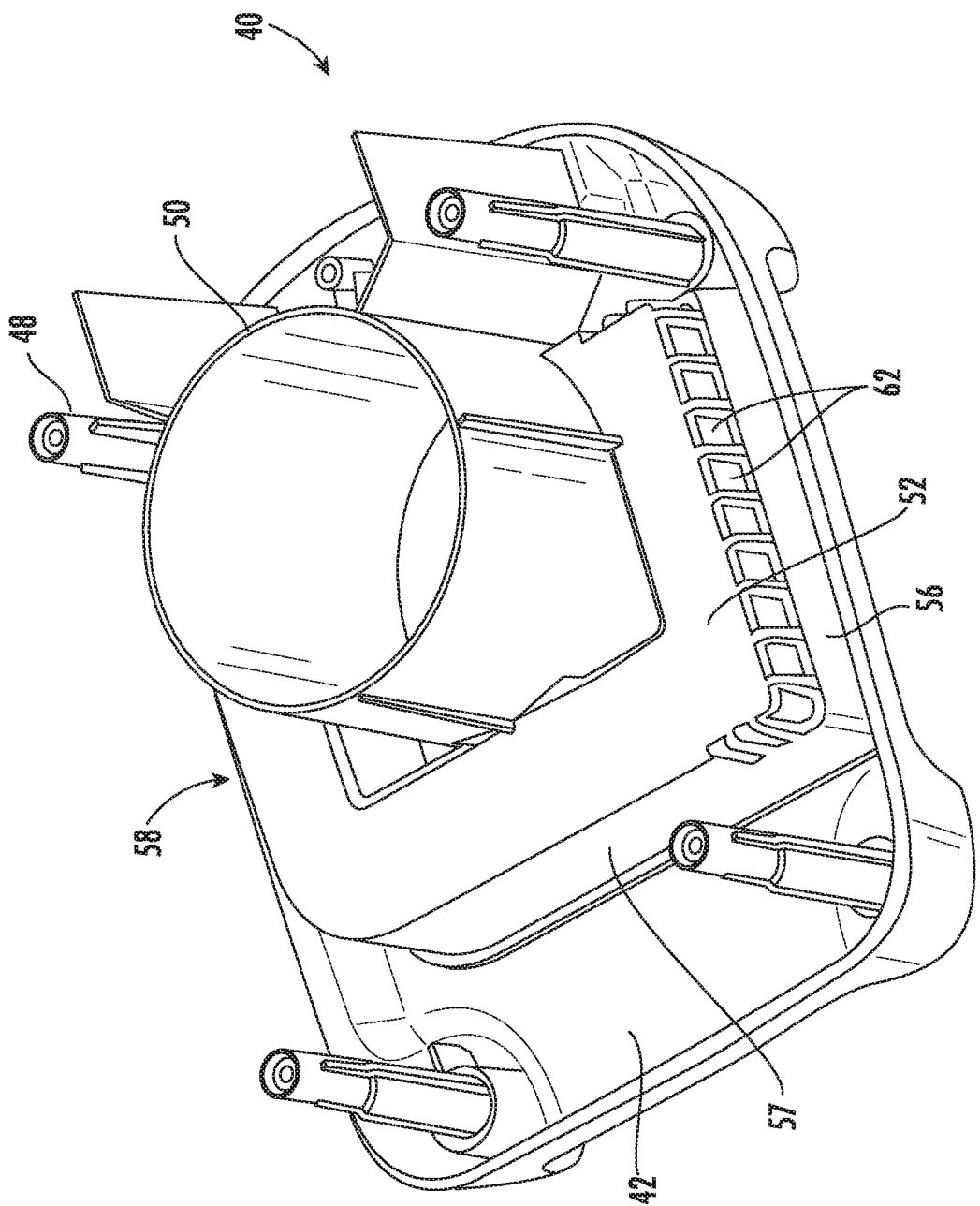
FIG. 6 is a top perspective view of the lower housing of the blender of FIG. 1.
Figure 7:
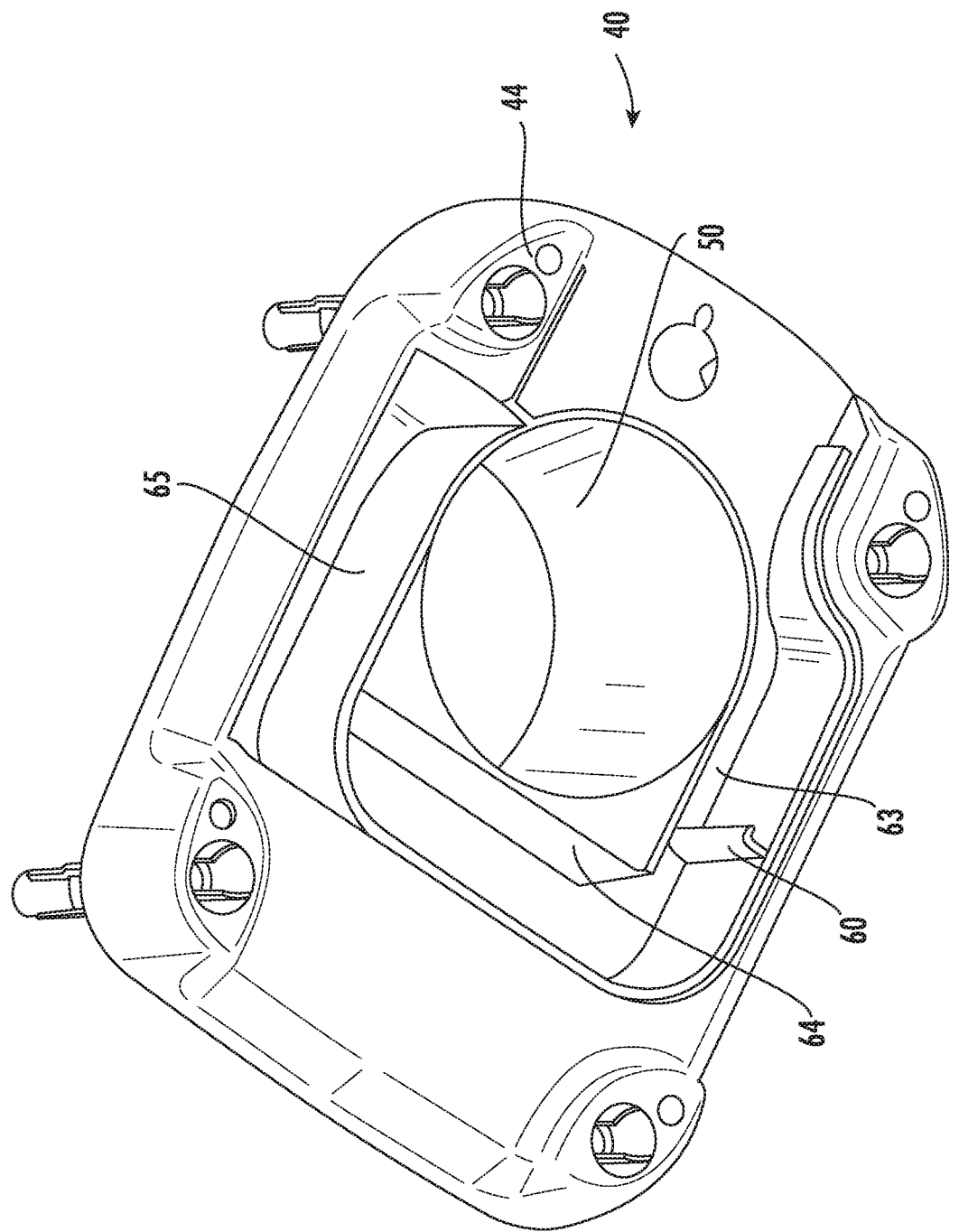
FIG. 7 is a bottom perspective view of the lower housing of FIG. 6.

As can be seen best in FIG. 5, together the lower housing 40 and the baffle plate 70 form a conduit C for air to follow after exiting the fan 32. More specifically, the conduit C is routed from a reservoir 90 below the fan 32 (see FIGS. 2 and 4) through a gap 91 between the lower edge of the shroud 50 and the floor 71, to a chamber 92 in front of the reservoir 90, through the choke point created by the gap 84, rearward into a chamber 95 that extends to the choke flanges 60, 86, through a gap 94 formed by the choke flanges 60, 86, rearward into a chamber 97 that extends to the neck 88, and into an expanded exhaust area 96. An exit port 98 is located at the rear end of the baffle plate 70 and the lower housing 40. The path followed by the conduit C is shown with arrows in FIG. 5.

As discussed above, the fan 34 is included to provide cooling to the motor 28. When in operation, the motor 28 generates considerable heat. Typically the motor 28 is configured to be disabled or otherwise deactivated upon reaching a specified temperature in order to prevent overheating. As such, the fan 34 is included to drawing cooling air past the motor 28. More specifically, air enters the base unit 24 from beneath the side of the lower housing 40 adjacent the side walls 56, 65, through the vents 62, and into space above the lower housing 40 but within the upper housing 26. The fan 34 draws the air over the top edge of the shroud 50 and down through the shroud 50. The air cools the motor 28 as it flows downwardly through the shroud 50. Once past the fan 34, the air follows the pathway defined by the conduit C above; namely, it flows into the reservoir 90, through the gap 91, to the forward area 92, through the gap 84, into the chamber 95, through the gap 94 formed by the choke flanges 60, 86, into the chamber 97, through the neck 88, into the exhaust area 96, and out of the exit port 98.

As noted above, the exit pathway for cooling air can be a source of noise for a blender, as sound waves from the motor and fan can follow the pathway without a physical barrier that would provide sound insulation. In the blender 20, the presence of components of the conduit C can assist in reducing noise passing through the conduit C. First, changes in direction of the noise tend to attenuate the noise. Thus, the flow decreases as sound waves reach each of (a) the floor 71 of the baffle plate 70, (b) the wall 74, and (c) the wall 76. Second, the combination of chambers (in which volume is relatively large) and choke points (in which the conduit narrows significantly in cross-section) in the conduit C also tend to attenuate the noise; each expansion of volume from a choke point into a chamber causes the sound waves to lose energy, which reduces noise. Thus, sound is reduced as it passes from (a) the shroud 50 into the reservoir 90, (b) the gap 91 into the chamber 92, (c) the gap 84 into the chamber 95, (d) the gap 94 between the choke flanges 60, 86 into the chamber 97, and (e) the neck 88 into the exhaust area 96. As a result of these various conditions that the sound waves experience, very little noise exits the exit port 98. Thus, the motor 28 of the blender 20 is able to provide sufficient power with adequate cooling and at a noise level that is acceptable to most consumers.

Also, it is notable that the conduit C is relatively lengthy while using available space within the base unit 24 to discharge cooling air and attenuate noise. More specifically, the conduit C travels below the motor 28 and fan 34 and forward of these components, then passes most of the length of one side of the base unit 24 before exiting at the rear of the base unit 24. As such, cooling air and sound travel approximately twice the "front to rear" dimension of the base unit. Also, in some embodiments, the cross-section of each successive chamber is less than that of the prior chamber. Further, in some embodiments, the cross-sectional area of a choke point may be between about 12 and 62 percent of the cross-sectional area of the chambers on either side thereof.

Those of skill in this art will appreciate that the blender 20 may take other forms. For example, the motor 28 may be of a different size or configuration, or in some embodiments may be separate from the fan 34. The fan 34 may have blades 36 of a different configuration. The shroud 50 may be taller or shorter, or may be positioned higher or lower on the lower housing 40. The lower housing 40 may be configured with vents 62 in a different location, or vents may be located on a different component, such that the intake of environmental air for cooling occurs at a different position. In some embodiments, the lower and upper housings 40, 26 may be configured such that some features of one component are present on the other, or these components may be formed in multiple separate pieces.

Also, the conduit C may take a different configuration. For example, one or more of the chambers 92, 95, 97 and the exhaust area 96 may be omitted, or may be configured differently. In some embodiments, there may be additional chambers. The gaps 84, 91, 94 and neck 88 may be configured differently or formed with different components. The flow direction of the cooling air may vary; as one example, the passageway 89 may be on the other side of the blender 20 (i.e., on the left side as shown in FIG. 5), with the chambers 95, 97 being located on the opposite side also (i.e., on the right side as shown in FIG. 5). Other convoluted, serpentine, spiral or other configurations may also be employed.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A blender, comprising:
   a base unit, the base unit including a vent in fluid communication with external air;
   a motor mounted within the base unit and configured to drive blender blades;
   a cooling fan mounted in the base unit to draw air though the vent and past the motor; and
   a conduit formed within the base unit that provides an exit path for air drawn past the motor by the fan, once past the fan the air follows a pathway defined by the conduit, the conduit defining the pathway that serially includes a reservoir beneath the fan, a first choke point, a first chamber, a second choke point, a second chamber, a third choke point, and a third chamber in fluid communication with an exit port at the rear of the base unit.

2. The blender defined in claim 1, wherein the first choke point is positioned forwardly of the reservoir.

3. The blender defined in claim 2, wherein the first chamber is positioned forwardly of the first choke point.

4. The blender defined in claim 1, wherein the second choke point is positioned laterally of the first chamber.

5. The blender defined in claim 4, wherein the conduit comprises a fourth choke point and a fourth chamber.

6. The blender defined in claim 5, wherein at least one of the third and fourth choke points is positioned laterally of the reservoir.

7. The blender defined in claim 5, wherein the fourth chamber is positioned adjacent the exit port.

8. The blender defined in claim 1, wherein the base unit includes a lower housing having includes a generally cylindrical shroud that surrounds the motor.

9. The blender defined in claim 8, wherein the vent is located in the lower housing, and wherein the lower housing is configured such that air enters the vent from underneath a side of the base unit.

10. The blender defined in claim 9, wherein the vent is located on a side of the base unit opposite the third choke point.

11. The blender defined in claim 1, wherein the fan is attached to a shaft of the motor.

12. The blender defined in claim 1, further comprising a control unit mounted on a front portion of the base unit.

13. The blender defined in claim 1, wherein the third chamber is smaller in cross-section than the second chamber.

14. A blender, comprising:
    a base unit, the base unit including a vent in fluid communication with external air;
    a motor mounted within the base unit and configured to drive blender blades;
    a cooling fan mounted in the base unit to draw air though the vent and past the motor; and
    a conduit formed within the base unit that provides an exit path for air drawn past the motor by the fan, once past the fan the air follows a pathway defined by the conduit, the conduit defining the pathway that serially includes a reservoir beneath the fan, a first choke point, a first chamber, a second choke point, a second chamber, a third choke point, a third chamber, a fourth choke point, and a fourth chamber in fluid communication with an exit port at the rear of the base unit.

15. The blender defined in claim 14, wherein the first choke point is positioned forwardly of the reservoir.

16. The blender defined in claim 15, wherein the first chamber is positioned forwardly of the first choke point.

17. The blender defined in claim 14, wherein the second choke point is positioned laterally of the first chamber.

18. The blender defined in claim 14, wherein the fourth choke point is positioned laterally of the reservoir, and wherein the fourth chamber is positioned adjacent the exit port.

19. The blender defined in claim 14, wherein the third chamber is smaller in cross-section than the second chamber.

20. A blender, comprising:
    a base unit, the base unit including a vent in fluid communication with external air, the vent being located on one side of the base unit;
    a motor mounted within the base unit and configured to drive blender blades;
    a cooling fan mounted in the base unit to draw air though the vent and past the motor; and
    a conduit formed within the base unit that provides an exit path for air drawn past the motor by the fan, once past the fan the air follows a pathway defined by the conduit, the conduit defining the pathway serially includes a reservoir beneath the fan, a first choke point, a first chamber, a second choke point, and a second chamber, the second choke point and the second chamber being located laterally of the first chamber on an opposite side of the base unit from the vent, the conduit being in fluid communication with an exit port at the rear of the base unit.

21. The blender defined in claim 20, wherein the conduit further comprises a third choke point and a third chamber, the third chamber being located on the side of the base unit opposite the vent.

22. The blender defined in claim 21, wherein the first choke point is forward of the reservoir.

23. The blender defined in claim 20, wherein the third chamber is smaller in cross-section than the second chamber.

* * * * *